US011805146B2

(12) United States Patent
Henderson

(10) Patent No.: US 11,805,146 B2
(45) Date of Patent: Oct. 31, 2023

(54) SYSTEM AND METHOD FOR DETECTION PROMOTION

(71) Applicant: ServiceNow, Inc., Santa Clara, CA (US)

(72) Inventor: Lisa Sherilyn Henderson, Temecula, CA (US)

(73) Assignee: ServiceNow, Inc., Santa Clara, CA (US)

( * ) Notice: Subject to any disclaimer, the term of this patent is extended or adjusted under 35 U.S.C. 154(b) by 431 days.

(21) Appl. No.: 16/862,182

(22) Filed: Apr. 29, 2020

(65) Prior Publication Data

US 2021/0344701 A1 Nov. 4, 2021

(51) Int. Cl.
*G06F 16/00* (2019.01)
*H04L 9/40* (2022.01)
*G06F 16/2455* (2019.01)
*G06F 16/22* (2019.01)

(52) U.S. Cl.
CPC ...... *H04L 63/1433* (2013.01); *G06F 16/2282* (2019.01); *G06F 16/24558* (2019.01); *G06F 16/24564* (2019.01)

(58) Field of Classification Search
CPC ........... G06F 16/24558; G06F 16/2282; G06F 16/24564
See application file for complete search history.

(56) References Cited

U.S. PATENT DOCUMENTS

| | | |
|---|---|---|
| 5,978,594 A | 11/1999 | Bonnell et al. |
| 6,321,229 B1 | 11/2001 | Goldman et al. |
| 6,799,189 B2 | 9/2004 | Huxoll |
| 6,816,898 B1 | 11/2004 | Scarpelli et al. |
| 6,895,586 B1 | 5/2005 | Brasher et al. |
| 7,027,411 B1 | 4/2006 | Pulsipher et al. |
| 7,392,300 B2 | 6/2008 | Anantharangachar et al. |
| 7,617,073 B2 | 11/2009 | Trinon et al. |

(Continued)

FOREIGN PATENT DOCUMENTS

WO WO 2017180611 A1 * 10/2017
WO WO2017180611 A1 * 10/2017

OTHER PUBLICATIONS

Sacm ECP Mapping draft-haynes-sacm-ecp-mapping, SACM 2016.*

(Continued)

*Primary Examiner* — Daniel A Kuddus
(74) *Attorney, Agent, or Firm* — FLETCHER YODER PC

(57) ABSTRACT

A modified configuration management database (CMDB) system is disclosed in which detected configuration item (CI) vulnerabilities are stored as less-resource-intensive detection objects, rather than as more-resource-intensive vulnerable item (VI) objects. The system includes a vulnerability response (VR) server that enables promotion rules to be created and periodically applied to the stored detections. When the conditions of a detection promotion rule are satisfied by information relating to a stored detection, a new VI may be created and related to the stored detection within the CMDB. The disclosed promotion rules can be configured to ensure that VIs are only automatically created for high-risk or relevant detections, substantially reducing the number of VIs to be created, stored, and managed. As such, the disclosed system substantially reduces resource consumption and improves the efficiency and operation of the CMDB.

20 Claims, 10 Drawing Sheets

(56) References Cited

U.S. PATENT DOCUMENTS

| | | |
|---|---|---|
| 7,685,167 B2 | 3/2010 | Mueller |
| 7,877,783 B1 | 1/2011 | Cline et al. |
| 7,933,927 B2 | 4/2011 | Dee et al. |
| 7,941,506 B2 | 5/2011 | Bonal et al. |
| 7,945,860 B2 | 5/2011 | Vambenepe et al. |
| 8,082,222 B2 | 12/2011 | Rangarajan et al. |
| 8,346,752 B2 | 1/2013 | Sirota et al. |
| 8,380,645 B2 | 2/2013 | Kowalski |
| 8,554,750 B2* | 10/2013 | Rangarajan ......... G06F 16/2365 707/769 |
| 8,646,093 B2* | 2/2014 | Myers ................... G06F 21/105 713/157 |
| 8,683,032 B2 | 3/2014 | Spinelli et al. |
| 8,745,040 B2* | 6/2014 | Kowalski ................ G06Q 10/00 707/769 |
| 8,812,539 B2* | 8/2014 | Milousheff ......... G06F 16/2365 707/769 |
| 8,818,994 B2* | 8/2014 | Kowalski ................ G06Q 10/00 707/769 |
| 8,907,988 B2 | 12/2014 | Poston et al. |
| 9,015,188 B2* | 4/2015 | Behne ................ G06F 16/2365 713/1 |
| 9,037,536 B2* | 5/2015 | Vos .................... G06F 16/2453 707/674 |
| 9,137,115 B2* | 9/2015 | Mayfield ................... G06F 7/32 |
| 9,261,372 B2 | 2/2016 | Cline et al. |
| 9,323,801 B2 | 4/2016 | Morozov et al. |
| 9,412,084 B2 | 8/2016 | Kowalski et al. |
| 9,467,344 B2 | 10/2016 | Gere et al. |
| 9,534,903 B2 | 1/2017 | Cline et al. |
| 9,613,070 B2 | 4/2017 | Kumar et al. |
| 9,631,934 B2 | 4/2017 | Cline et al. |
| 9,659,051 B2 | 5/2017 | Hutchins et al. |
| 9,792,387 B2 | 10/2017 | George et al. |
| 9,852,165 B2 | 12/2017 | Morozov |
| 9,911,087 B1 | 3/2018 | Henderson et al. |
| 9,967,162 B2 | 5/2018 | Spinelli et al. |
| 10,002,203 B2 | 6/2018 | George et al. |
| 10,015,186 B1 | 7/2018 | Tamir et al. |
| 10,133,991 B2 | 11/2018 | Henderson et al. |
| 10,181,984 B1 | 1/2019 | Henderson et al. |
| 2010/0192228 A1* | 7/2010 | Levi ...................... G06F 21/577 726/25 |
| 2012/0304300 A1* | 11/2012 | LaBumbard .......... G06F 21/577 726/25 |
| 2015/0040230 A1* | 2/2015 | Oliphant ............. H04L 63/1441 726/25 |
| 2018/0219908 A1* | 8/2018 | Tamir .................. H04L 63/1441 |
| 2019/0102560 A1* | 4/2019 | Zettel, II ............. G06F 11/3051 |
| 2019/0220469 A1 | 7/2019 | Henderson |
| 2019/0342323 A1* | 11/2019 | Henderson ........... G06F 16/285 |

OTHER PUBLICATIONS

U.S. Appl. No. 16/450,601, filed Jun. 24, 2019, Henderson.
U.S. Appl. No. 16/682,878, filed Nov. 13, 2019, Vester et al.
U.S. Appl. No. 62/568,087, filed Oct. 4, 2017, Amradkar et al.

* cited by examiner

FIG. 11

≡ VIT1998504

ⓘ 3 DAYS REMAINING UNTIL THE REMEDIATION TARGET DATE, ACCORDING TO THE IUJOI REMEDIATION TARGET RULE.

SELECT SECURITY TAG ⊕

| | | | |
|---|---|---|---|
| NUMBER | VIT1998504 | STATE | OPEN |
| SOURCE | QUALYS | ASSIGNMENT GROUP | |
| RISK RATING | 3-MEDIUM | ASSIGNED TO | |
| RISK SCORE | 60 | CREATED | 2019-11-13 00:24:02 |
| REMEDIATION TARGET RULE | IUJOI | LAST OPENED | 2019-11-06 |
| REMEDIATION TARGET | 2019-12-06 00:00:00 | UPDATED | 2019-11-15 06:48:33 |
| REMEDIATION STATUS | IN-FLIGHT | AGE | NEW |
| VULNERABILITY | QID-90375 | | |
| CONFIGURATION ITEM | DEM001 | | |

— 386 → SOURCE
— 388 → VULNERABILITY
— 390 → CONFIGURATION ITEM

VULNERABILITY | DETECTIONS | CONFIGURATION DETAILS | NOTES

DETECTIONS — 380

| | ≡ STATUS | ≡ FIRST ROUND | ≡ LAST FOUND | ≡ IP ADDRESS | ≡ PORT | ≡ LAST OPENED | ≡ AGE |
|---|---|---|---|---|---|---|---|
| ⓘ | OPEN | (EMPTY) | 2016-06-08 23:36:34 | 10.0.222.169 | | 2019-11-05 17:17:29 | 7-29DAYS |
| + | INSERT A NEW ROW... | | | | | | |

— 382
— 384
— 232

SYSTEM AND METHOD FOR DETECTION PROMOTION

BACKGROUND

The present disclosure relates generally to vulnerability response, and more specifically, to using detections and detection promotion to manage the creation of vulnerability items (VIs) in a CMDB.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

Certain cloud computing platforms can host a configuration management database (CMDB) to manage configuration items (CIs) associated with a client network. Additionally, vulnerabilities identified for CIs of the client network may be tracked by the CMDB. To do this, the CMDB typically creates a vulnerable item (VI) in a VI table of the CMDB for each detected vulnerability. This results in the generation, processing, and storage of a large volume of VIs, including multiple VIs that may be representative of the same underlying vulnerability. It is presently recognized that a substantial number of VIs that are created in present CMDB designs are less critical or even completely irrelevant, and that VIs that are more critical or relevant may be overlooked in the vast collection of VIs. Additionally, since VIs are typically stored in an audited table and may be associated with considerable workflows and, it is presently recognized that there is considerable processing and memory resources associated with creating and modifying VIs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a modified CMDB design in which CI vulnerabilities identified by scanning devices of the client network are stored within the database as detection objects (also referred to herein as "detections" or "detection events"). In this design, detections are considerably lighter-weight, lower-cost objects than vulnerable items (VIs), and generally storing information collected during the scan regarding the CI vulnerabilities. As such, the creation of detections does not involve the additional processing (e.g., workflows, assignment, prioritization, etc.) associated with creating VIs, which represents a considerable reduction in resource overhead. Additionally, since the disclosed detections are stored in a non-audited detections table, this further reduces the resource cost with respect to creating and storing detections relative to that of creating and storing VIs.

Additionally, in the disclosed CMDB design, the detections collected and stored in the detections table may subsequently be processed according to predefined criteria to determine whether or not a VI will be generated in the VIs table and associated with one or more qualifying detections, which may be referred to herein as "detection promotion" or "promotion." As discussed below, the disclosed system includes a detection promotion rule object (also referred to herein as a "detection promotion rule"), which defines a set of conditions. When these conditions are satisfied by a stored detection (and/or its related data within the CMDB), a VI is created and then related to the detection within the CMDB. The system includes a graphical user interface (GUI) that enables a user to define and modify detection promotion rules, which are stored in a detection promotion rules table. The system includes instructions to periodically execute the stored detection promotion rules to generate or modify VIs in the VI table. In certain embodiments, the detection promotion rules may include details (e.g., VI parameters) to be used in creating the VI, such as attribute values, VI grouping, assignment, prioritization, and so forth. Additionally, in certain embodiments, a detection promotion rule may modify existing VIs, such as modifying an attribute values, VI grouping, assignment, and/or prioritization of an existing VI, in response to the particular criteria of the detection promotion rule being satisfied based on the stored detections and their corresponding information within related CMDB tables.

The disclosed promotion rules can be configured to ensure that VIs are not automatically created for low-risk or irrelevant detections, substantially reducing the number of VIs to be created, stored, and managed. For example, the detection promotion rules may create VIs in response to identifying stored detections representing vulnerabilities that involve manual remediation (e.g., via change requests) and/or individual handling, as well as detections corresponding to CIs that have been predetermined to be important or critical to the operation of the client network. Additionally, since one or more detections can be associated with a single VI, the disclosed design reduces the number of stored VIs that are redundant, in the sense that that they represent the same underlying vulnerability. Moreover, since the detection objects are considerably lower in processing, memory, and storage resource cost compared to VI objects, the disclosed design substantially reduces resource consumption and improves the efficiency and operation of the CMDB.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 11 is a simulated screenshot of a portion of an embodiment of the GUI that enables a user to view and modify a VI and illustrating an example VI has been created and associated with a detection by a detection promotion rule, in accordance with aspects of the present disclosure.

DETAILED DESCRIPTION

Figure 1:
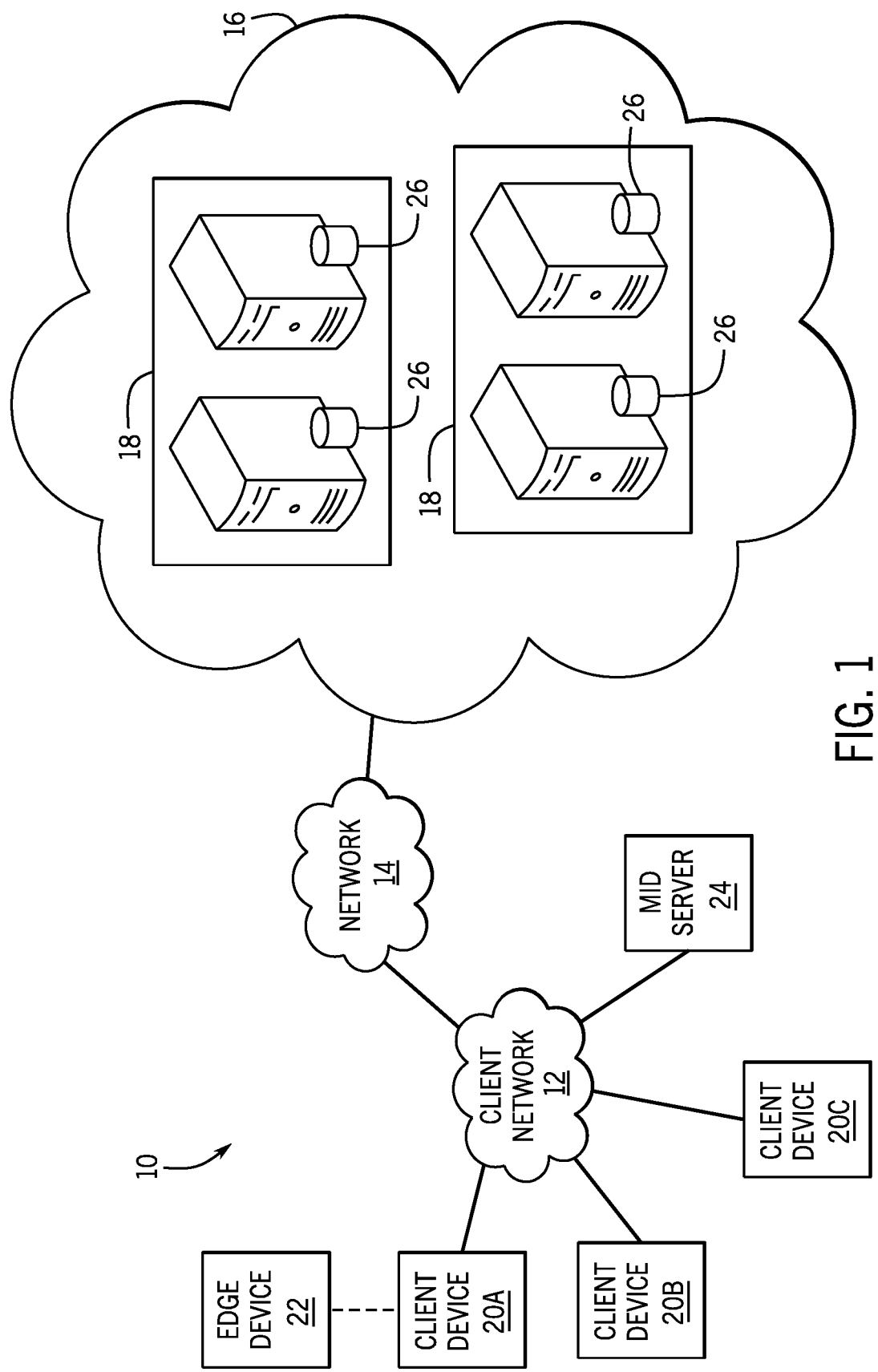
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB.

In a CMDB system, CIs of a managed client network may be scanned for vulnerabilities. For example, a third-party vulnerability scanning server or a discovery server may send requests (e.g., data packets, login attempts, input parameters, and so forth) to particular internet protocol (IP) addresses and ports of various devices and systems hosted on or associated with the client network (sometimes referred to as "port scanning") to identify known vulnerabilities in these systems. As used herein, a "vulnerability" refers to a documented flaw or weakness in the hardware or software of a CI that could potentially result in undesired behavior (e.g., unexpected output, crashing, data loss or corruption) or unauthorized access of the CI. For example, there may be a known JAVA vulnerability in a version of JAVA that is installed on a server that operates on a client network. When the example server is scanned for vulnerabilities, the same vulnerability may be detected in a number of different JAVA applications or services that are hosted on different ports of the same server.

Prior to the present disclosure, when vulnerabilities were detected during this vulnerability scanning process, a vulnerable item (VI) would be created and stored in a VI table of the CMDB for each detection of a vulnerability. This results in the generation of a large volume of VIs being stored in the VI table, including multiple VIs that may be representative of the same underlying vulnerability, as noted above. Additionally, it is presently recognized that a substantial number of VIs that are created in this design are less critical or even completely irrelevant. For example, many VIs are not reviewed by a technician for resolution until after a period of time (e.g., a patch window) has passed without the underlying vulnerability being resolved by a software patch or release update. Additionally, certain detected vulnerabilities are automatically resolved, for example, as a part of normal updating and maintenance of the devices on the client network. It is also recognized that, in current CMDB designs, VIs are created for all detected vulnerabilities, including those having no known exploit, or having only proof-of-concept exploits with no exploits "in the wild." Additionally, in current CMDB designs, since it may be desirable for information regarding all detected vulnerabilities to be retained, VIs are also created for known false positives, despite there being no real underlying vulnerability to be addressed.

Since the creation and/or modification of VIs is generally implemented with corresponding workflows, prioritization, and other processing, it is presently recognized that considerable processing and memory resources are associated with creating and modifying VI objects. For example, when a VI is created in the VIs table, one or more workflows may be trigged to execute that establishes relationships between the created VI and other records in the CMDB. By way of particular example, workflows may be executed to assign VIs to particular VI groups, to rate the criticality and/or severity of the VIs, to set and monitor remediation target times, and so forth, which can involve considerable processing. Additionally, since the VIs table is usually implemented as an audited table in which all table changes are closely monitored and separately tracked, there is substantial processing, memory, and/or storage overhead associated with operating and maintaining this bulky VIs table.

With this in mind, present embodiments are directed to a modified CMDB design in which detected CI vulnerabilities identified during vulnerability scanning of the client network are stored within the database as detections or detection events. In this design, detections are considerably lighter-weight, lower-cost objects than VIs, generally storing only a limited amount of information collected during the vulnerability scan. As such, the creation of detections does not involve the additional processing (e.g., workflow, prioritization, etc.) that is associated with creating VIs, representing a considerable reduction in resource overhead. Additionally, in present embodiments, detections are stored in a non-audited detections table, which further reduces the resource cost with respect to creating and storing detections relative to vulnerable items.

Additionally, in the disclosed CMDB design, the detections collected and stored in the detections table may subsequently be processed according to predefined criteria to determine whether or not corresponding VIs should be generated. As discussed below, the disclosed system includes a detection promotion rule object, which defines a set of conditions that, when satisfied by the detections and their related information, results in detection promotion and creation or modification of a VI. The system includes instructions to periodically execute the detection promotion rules stored in the detection promotion rules table to generate or modify VIs in the VI table. For example, as discussed below, detection promotion rules may specify that, in response to identifying detections meeting particular criteria, VIs should be created that are associated with these detections within the CMDB. In certain embodiments, the detection promotion rules may include details (e.g., VI parameters) specifying particular attribute values, VI grouping, assignment, prioritization, and so forth, for the newly created VI.

The disclosed promotion rules can be customized to ensure that VIs are only automatically created for higher-risk detections and detections for critical CIs, substantially reducing the number of VIs to be created, stored, and managed. For example, the detection promotion rules may create VIs in response to identifying stored detections related to vulnerabilities that involve manual remediation (e.g., via change requests) and/or individual handling, as well as detections related to important or critical CIs of the client network. Additionally, since one or more detections can be associated with a single VI, the disclosed design reduces the number of redundant VIs. Moreover, since the detections are considerably lower in processing, memory, and storage resource cost compared to VIs, the disclosed design substantially reduces resource consumption and improves the efficiency and operation of the CMDB.

With the preceding in mind, the following figures relate to various types of generalized system architectures or configurations that may be employed to provide services to an organization in a multi-tenant or multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
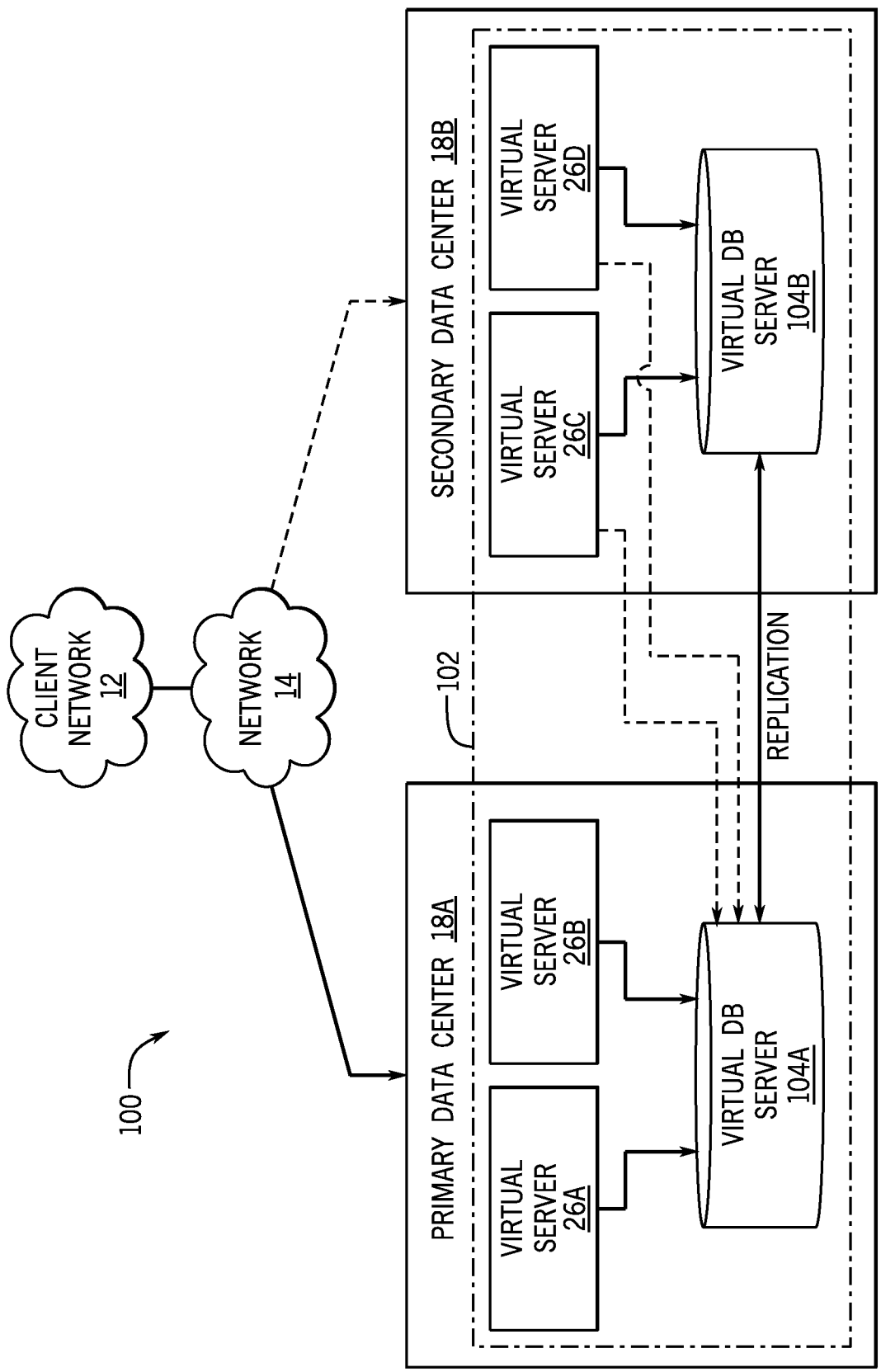
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
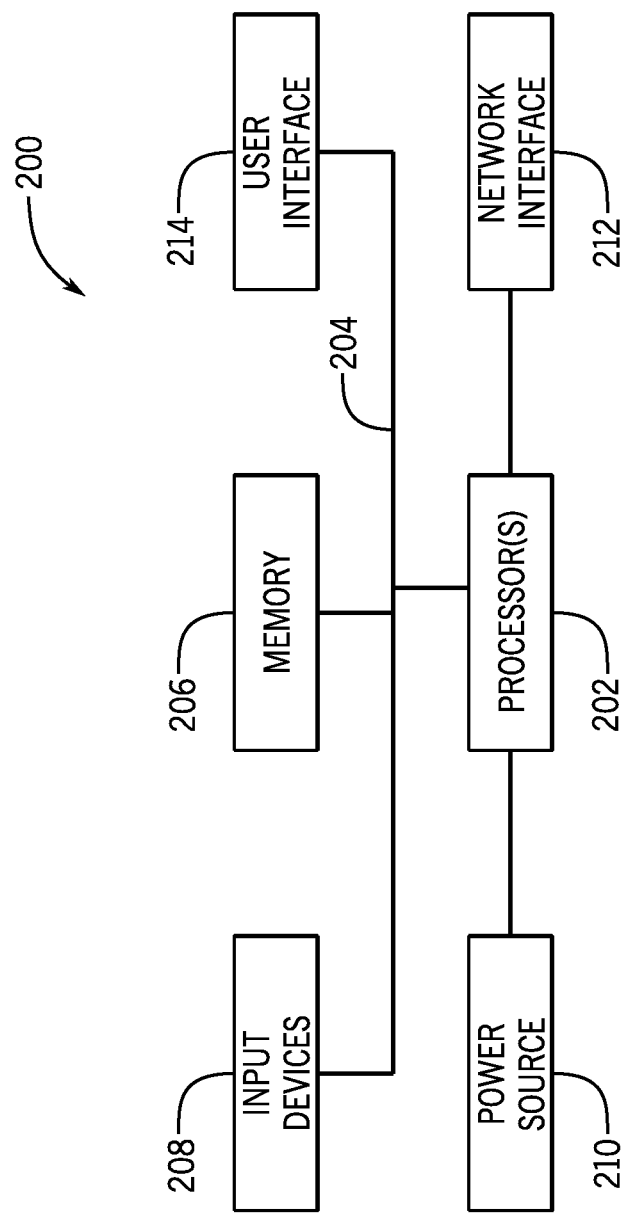
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
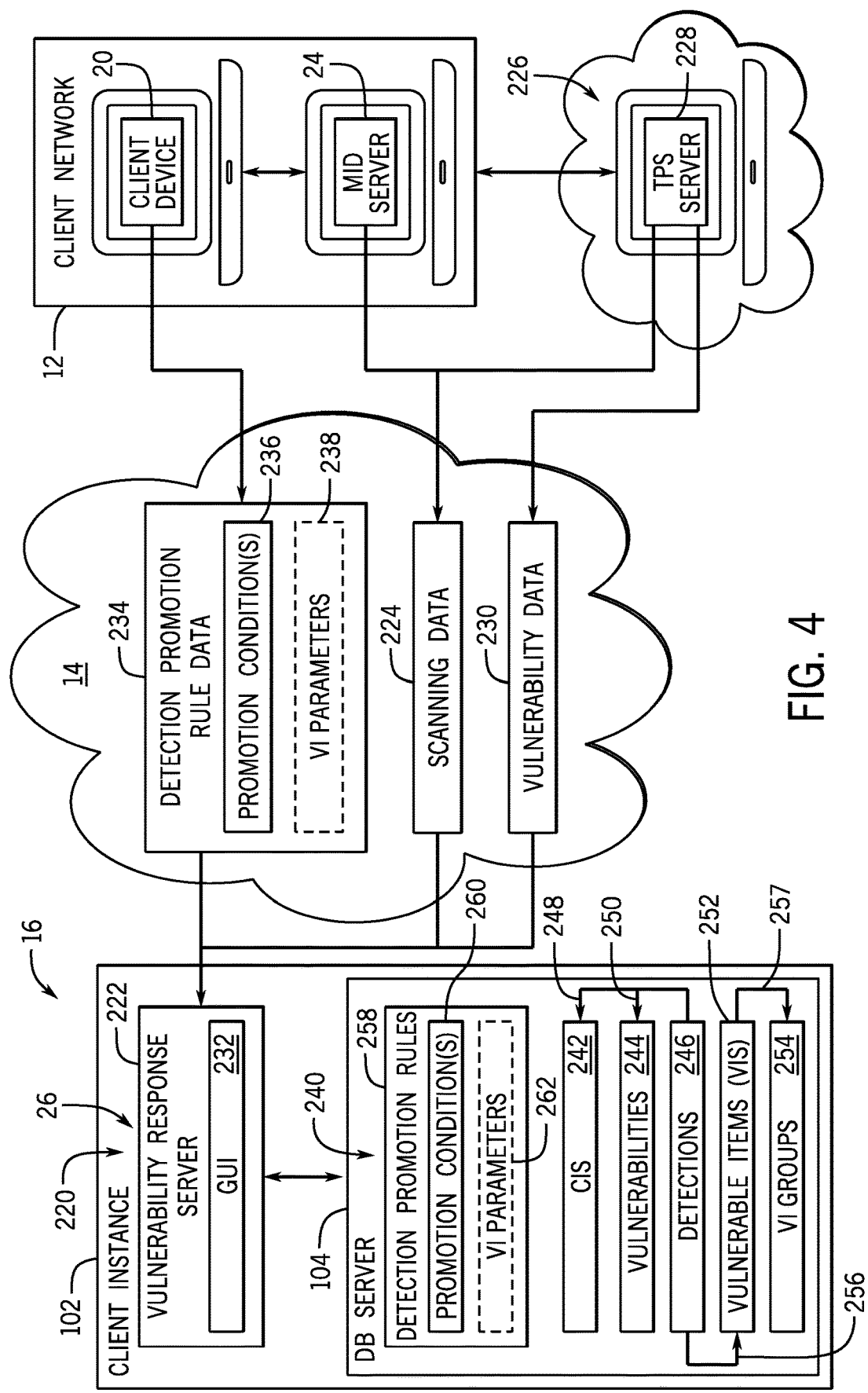
FIG. 4 is a block diagram illustrating an embodiment in which a client instance hosts a CMDB that includes a vulnerability response (VR) server, in accordance with aspects of the present disclosure.

With the preceding in mind, FIG. 4 is a block diagram illustrating an embodiment in which at least one virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 and the client network 12 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser of the client device 20.

The illustrated client instance 102 hosts a configuration management database (CMDB) system 220, which includes a vulnerability response (VR) server 222 and a communicatively coupled database server 104. In certain embodiments, the VR server 222 may additionally host other functionality of the CMDB 220. The client instance 102 is communicatively coupled to various external systems via the network 14 to enable the exchange of data with these systems. For the illustrated embodiment, these external systems include the client device 20 and the MID server 24 that are disposed on the client network 12. In certain embodiments, the MID server 24 may be configured to scan the CIs of the client network 12 to detect vulnerable CIs, and then to report the scanning data 224 to the VR server 222 of the client instance 102.

Additionally, for the illustrated embodiment, a third-party scanning (TPS) service 226 is illustrated as being communicatively coupled to both the client network 12 and to the client instance 102 via suitable network connections (e.g., via the network 14, via virtual private network (VPN) connections). The TPS service 226 includes a TPS server 228 that is configured to scan the CIs of the client network 12 to detect vulnerable CIs, and then to report vulnerability scanning data 224 to the VR server 222 of the client instance 102. In certain embodiments, one or both of the MID server 24 and the TPS server 228 may collect and provide the scanning data 224 to the VR server 222 of the client instance 102. The scanning data 224 may include information related to the detected CI vulnerability, such as the CI for which the vulnerability was detected, a unique identifier for the vulnerability, a first time at which the vulnerability was detected, a most recent time that the vulnerability was detected, an internet protocol (IP) address and/or port associated with the detected vulnerability, an identity of the TPS service that detected the vulnerability, and/or any other suitable information regarding the detected CI vulnerabilities. The VR server 222 then provides the received scanning data 224 to the database server 104 for storage, as discussed below.

Additionally, for the illustrated embodiment, the VR server 222 also receives vulnerability data 230 from the TPS service 226 or another suitable service. This vulnerability data 230 may include further details regarding vulnerabilities identified in the scanning data 224, such as a unique identifier for the vulnerability, a measure of the severity of the vulnerability (e.g., low, medium, high, critical), an indication of whether or not an exploit exists for the vulnerability, and/or any other suitable information regarding each of the vulnerabilities included in the scanning data 224. The VR server 222 then provides the received vulnerability data 230 to the database server 104 for storage.

The illustrated VR server 222 includes a graphical user interface (GUI) 232 that enables a user of the client device to view and modify detections, VIs, and detection promotion rules, as discussed in more detail below with respect to FIGS. 8-11. As illustrated in FIG. 4, the VR server 222 may receive detection promotion rule data 234, for example, in response to a user providing suitable inputs to the GUI 232 illustrated in FIG. 10 via the web browser of the client device 20. As illustrated in FIG. 4, the detection promotion rule data 234 includes one or more promotion conditions 236 defining criteria that, when satisfied by data relating to detections stored within the CMDB, results in the creation or modification of vulnerable items (VIs). In certain embodiments, the detection promotion rule data 234 may also include VI parameters 238 that define how a VI is to be created or modified in response to the promotion conditions being satisfied. For example, the VI parameters 238 may indicate a risk rating or risk score for the VI, a state of the VI, a priority of the VI, an assignment of the VI for remediation, a VI group to which the VI should be assigned, and/or any other suitable VI information. In certain embodiments in which an existing VI is modified in response to a detection promotion rule being satisfied, the VI parameters 238 may include identities (e.g., unique identifiers) of the VIs to be modified. In other embodiments, the detection promotion rule data 234 may lack VI parameters 238, and the VR server 222 may be configured to create a new VI having default or predefined values in response to the detection promotion rule being satisfied by the stored detections.

The database server 104 hosts a number of tables in a data schema or model 240 that supports operation of the VR server 222 and the CMDB 220. These tables include a configuration items (CIs) table 242 that stores CI objects with information regarding CIs that are managed by the CMDB 220. The vulnerabilities table 244 stores information regarding known vulnerabilities, which may be received from the TPS service 226, as discussed above. The detections table 246 stores detection objects that are generated from the scanning data received from the TPS service 226 and/or the MID server 24, as noted above. Each detection stored in the detections table 246 is generally related to a CI of the CIs table 242 and a vulnerability of the vulnerabilities table 244, as indicated by the arrows 248 and 250. In certain embodiments, the detections table 246 may include an age field that indicates an age range into which a detection presently falls, wherein the age fields of the detections are periodically updated based on a current time and a stored value indicating a first time at which the vulnerability was detected during a vulnerability scan.

The tables of the illustrated data model 240 also include a vulnerable items (VIs) table 252 and a VI groups table 254.

Each of the VIs stored in the VIs table 252 may be related to one or more detections stored in the detections table 246, as indicated by the arrow 256. Additionally, each VI group in the VI groups table 254 is related to one or more VIs in the VIs table 252 that comprise the VI group, as indicated by the arrow 257. While not illustrated, it may be appreciated that, like the detections of the detections table 246, each of the VIs stored in the VIs table 252 may also be related to a particular CI in the CIs table 242 and a particular vulnerability in the vulnerabilities table 244.

It is presently recognized that the creation and/or modification of VIs is generally implemented with corresponding workflows, prioritization, and other processing, and as such, there is considerable processing and memory resources associated with creating and modifying these objects. For example, when VI is created in the VIs table 252, one or more workflows may be trigged to execute in response to configure the VI and/or establish relationships between the VI and other records in the CMDB. By way of particular example, workflows may be executed to assign VIs to particular VI groups of the VI groups table 254, to rate the criticality or severity of the VIs, to set and monitor remediation target times, and so forth, which involves considerable processing. Additionally, since the VIs table 252 is usually implemented as an audited table in which all table changes are closely monitored and separately tracked in audit tables of the CMDB (not illustrated), there is substantial processing, memory, and/or storage overhead associated with operating and maintaining the VIs table 252.

However, as mentioned, for the illustrated embodiment, CI vulnerabilities identified during a vulnerability scan of the client network 12 are stored within the detections table 246 of the CMDB 220 as detections. As noted, detections are considerably lighter-weight, lower-cost objects than VIs, generally storing information collected during the scan regarding the vulnerability. As such, the creation of detections does not involve the additional processing (e.g., workflow, prioritization, etc.) that is associated with creating VIs, representing a considerably lower resource cost. Additionally, since the detections table 246 is not an audited table and the VIs table 252 is an audited table, this further reduces the resource cost with respect to creating and storing detections relative to VIs.

The tables of the illustrated data model 240 include a detection promotion rules table 258 that stores detection promotion rule objects (also referred to herein as "detection promotion rules" or "promotion rules"). Each stored promotion rule includes one or more promotion conditions 260 that are defined based on the detection promotion rule data 234 received from the client device 20. Additionally, as noted, in some embodiments, certain promotion rules may also include the VI parameters 238 received from the client device 20.

Figure 5:
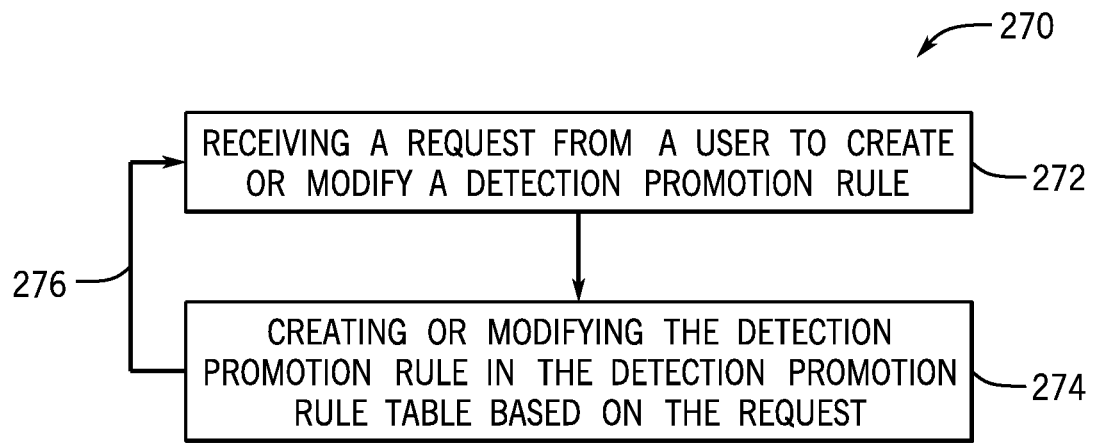
FIG. 5 is a flow diagram illustrating an embodiment of a process whereby the VR server creates or modifies a detection promotion rule based on received user input, in accordance with aspects of the present disclosure.

FIG. 5 is a flow diagram illustrating an embodiment of a process 270 whereby the VR server 222 creates or modifies a detection promotion rule based on input received from a user. In certain embodiments, the process 270 may be stored as instructions in a suitable memory (e.g., memory 206) and executed by a suitable processor (e.g., processor(s) 202) associated with the VR server 222. Additionally, the process 270 is merely illustrated as an example, and in other embodiments, the process 270 may include additional steps, omitted steps, repeated steps, and so forth, in accordance with the present disclosure.

The illustrated process 270 begins with the VR server 222 receiving (block 272) a request from a user to create or modify a detection promotion rule. For example, as illustrated in FIG. 4, the request includes the detection promotion rule data 234 received by the VR server 222 from the client device 20 based on input received from a user. The illustrated process 270 continues with the VR server 222 creating or modifying (block 274) the detection promotion rule in the detection promotion rules table 258 based on the detection promotion rule data 234 of the request. As indicated by the arrow 276, the VR server 222 may continue to receive additional requests (block 272), and may continue to create or modify detection promotion rules (block 274) based on these received requests.

Figure 6:
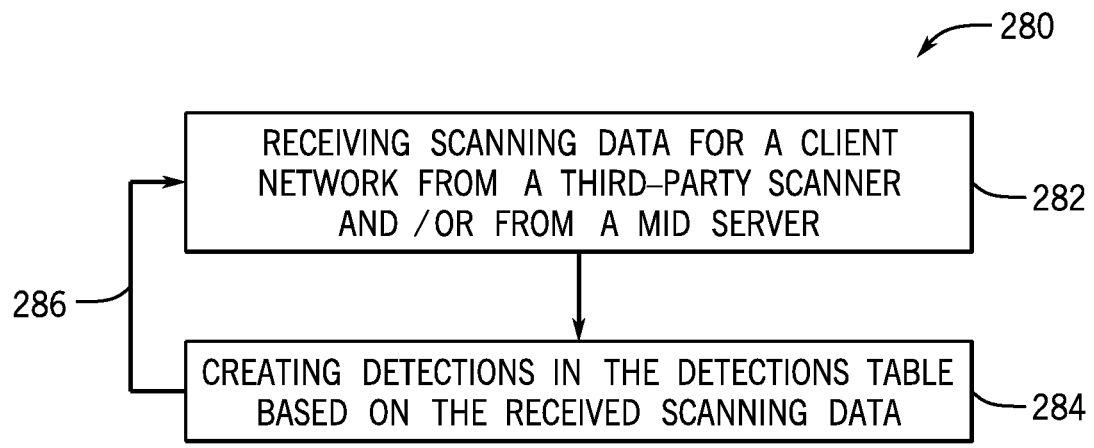
FIG. 6 is a flow diagram illustrating an embodiment of a process whereby the VR server creates detections based on received scanning data, in accordance with aspects of the present disclosure.

FIG. 6 is a flow diagram illustrating an embodiment of a process 280 whereby the VR server 222 creates detections based on the received vulnerability scanning data 224. In certain embodiments, the process 280 may be stored as instructions in a suitable memory (e.g., memory 206) and executed by a suitable processor (e.g., processor(s) 202) associated with the VR server 222. Additionally, the process 280 is merely illustrated as an example, and in other embodiments, the process 280 may include additional steps, omitted steps, repeated steps, and so forth, in accordance with the present disclosure.

The illustrated process 280 begins with the VR server 222 receiving (block 282) scanning data 224 for a client network 12 from a TPS server 228 and/or a MID server 24. The illustrated process 280 continues with the VR server 222 creating (block 284) detections in the detections table 246 based on the received scanning data 224. As indicated by the arrow 286, the VR server 222 may continue to receive additional scanning data (block 282), and may continue to create additional detections (block 284) based on the received scanning data 224. It may be appreciated that, as mentioned, vulnerability data also may be received from the TPS service in a similar manner to that described by FIG. 6, wherein the received vulnerability data is stored in the vulnerabilities table 244.

Figure 7:
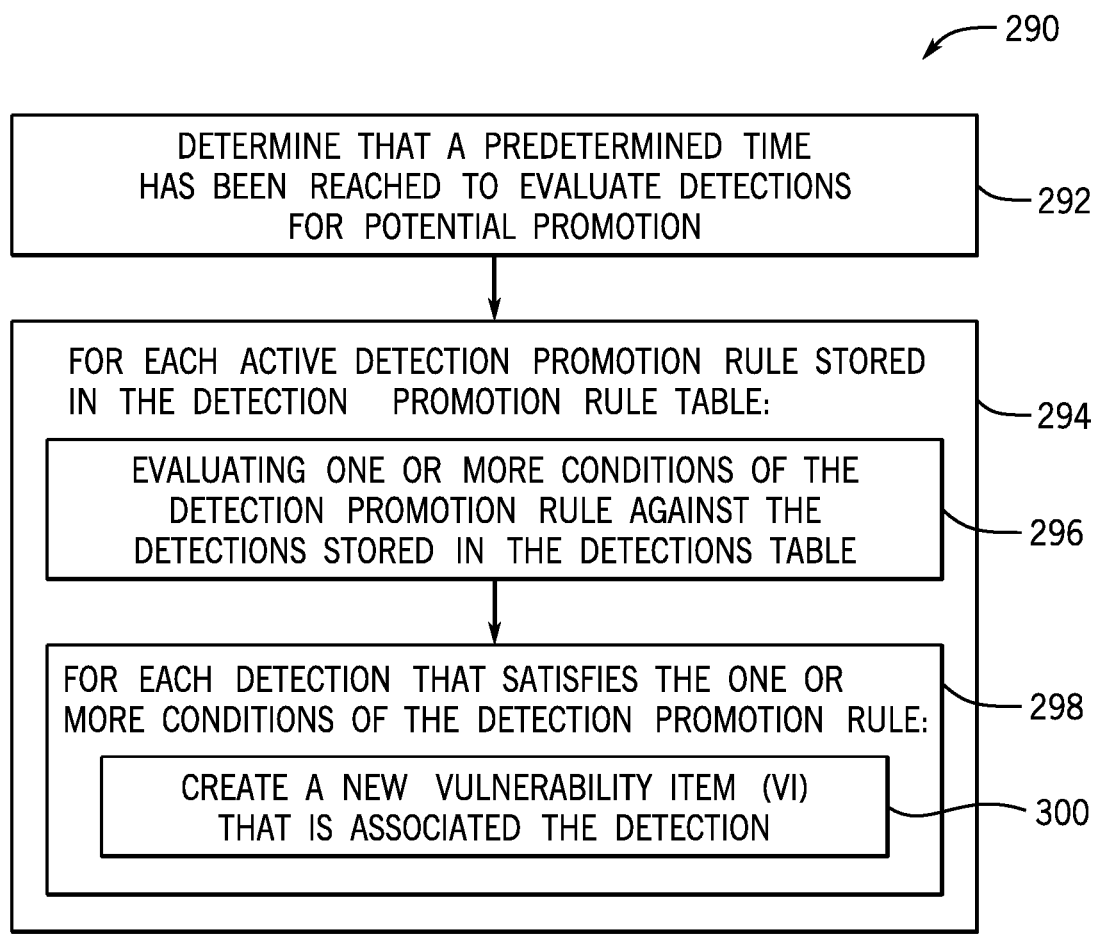
FIG. 7 is a flow diagram illustrating an embodiment of a process whereby the VR server applies the detection promotion rules to stored detections and creates a corresponding VI in response to the conditions of a detection promotion rule being satisfied, in accordance with aspects of the present disclosure.

FIG. 7 is a flow diagram illustrating an embodiment of a process 290 the VR server 222 applies detection promotion rules to stored detections, and then creates corresponding VIs, in response to the conditions of the detection promotion rules being satisfied by the stored detections and their corresponding data in the CMDB 220. In certain embodiments, the process 290 may be stored as instructions in a suitable memory (e.g., memory 206) and executed by a suitable processor (e.g., processor(s) 202) associated with the VR server 222. Additionally, the process 290 is merely illustrated as an example, and in other embodiments, the process 290 may include additional steps, omitted steps, repeated steps, and so forth, in accordance with the present disclosure.

The illustrated process 290 begins with the VR server 222 determining (block 292) that a predetermined time has been reached to evaluate detections for potential promotion. For example, in certain embodiments, the VR server 222 may be configured to periodically apply the detection promotion rules to evaluate the stored detections, such as on an hourly, daily, nightly, or weekly basis. The illustrated process 290 continues with the VR server 222 performing a number of actions for each active detection promotion rule stored in the detection promotion rules table 258, as indicated by the for-each-loop block 294. For example, the VR server 222 may query the database server 104 to receive a list of all detection promotion rules stored in the detection promotion rules table 258 having an active flag value of true, and then perform the actions contained within the for-each-loop block 294 for each of the detection promotion rules returned by the query.

The actions of the for-each-loop block 294 include the VR server 222 evaluating (block 296) one or more conditions of the detection promotion rule against the detections stored in the detections table 246, as well as corresponding information stored in other tables (e.g., CIs table 242, vulnerabilities table 244) related to these detections. The illustrated embodiment continues with the VR server 222 performing an action for each detection that satisfied the conditions of the detection promotion rule, as indicated by the second for-each-loop block 298. For example, the VR server 222 may query the database server 104 to receive a list of all detections that satisfy the conditions of the detection promotion rule, and then perform the action contained within the for-each-loop block 298 for each of the detections returned by the query. In certain embodiments, the VR server 222 may filter or disregard stored detections that have already been related to a VI. For each qualifying detection that satisfies the conditions of the detection promotion rule, the VR server 222 creates (block 300) a new VI that is associated with or related to the detections within the CMDB 220. It may be noted that, in other embodiments of the process 290, multiple detections may be related to a newly created VI.

Continuing through the illustrated embodiment of the process 290, after either creating the VI in block 300 or skipping the for-each-loop block 298 due to a lack of qualifying detections, the VR server 222 may select the next active detection promotion rule from the detection promotion rules table 258, and repeat the actions of blocks 296, 298, and 300 with respect to the next active detection promotion rule, until all of the active detection promotion rules have been processed in this manner. It may be appreciated that, for embodiments that enable VI modification, in response to the VR server 222 determining that a detection satisfies the conditions of the detection promotion rule and that there is a VI that is already related to the detection in the CMDB 220, the VR server 222 may modify the related VI according to the VI parameters 262 of the detection promotion rule.

Figure 8:
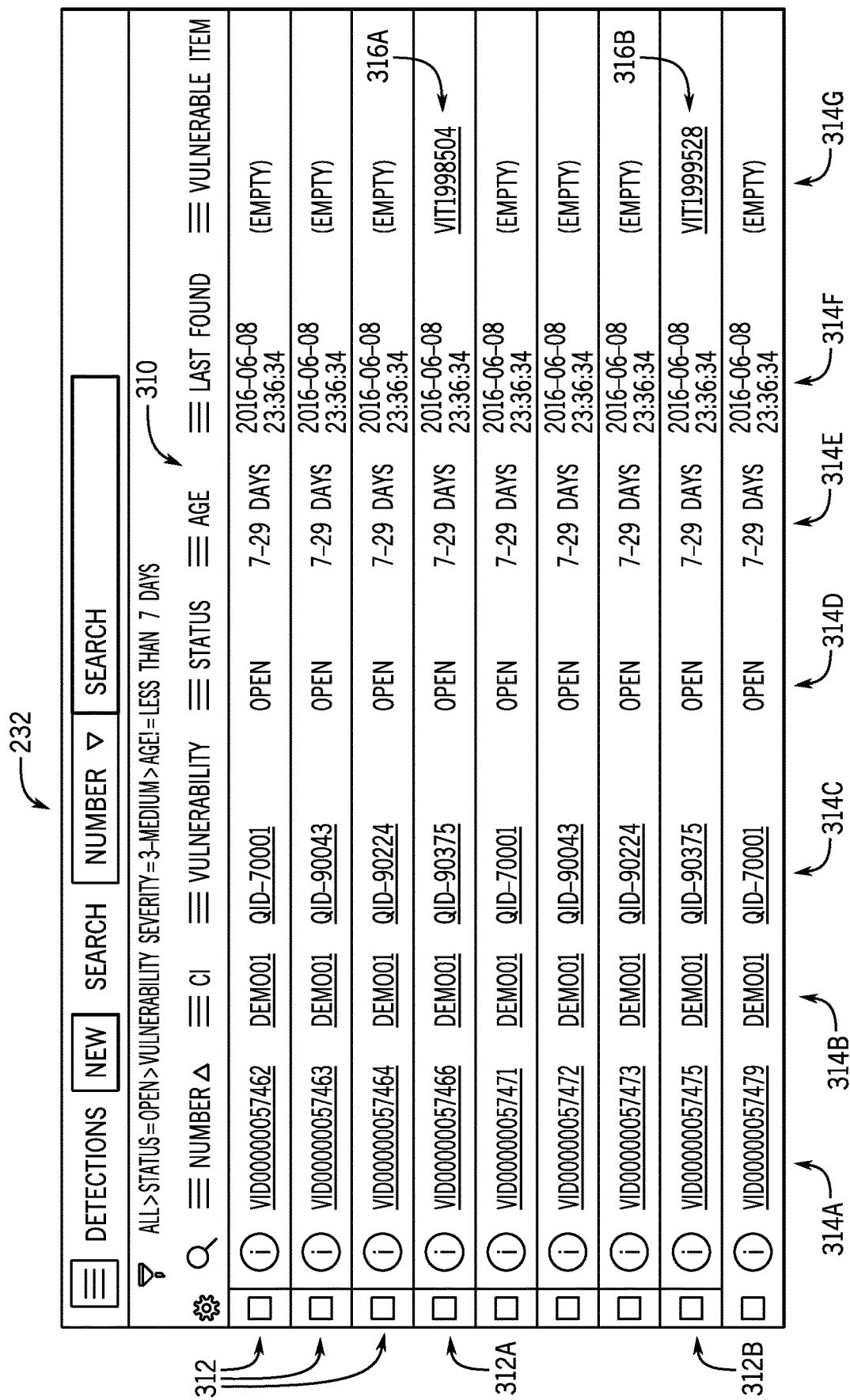
FIG. 8 is a simulated screenshot of a portion of an embodiment of a GUI that enables a user to view and modify detections stored in a detections table of the CMDB, in accordance with aspects of the present disclosure.
Figure 9:
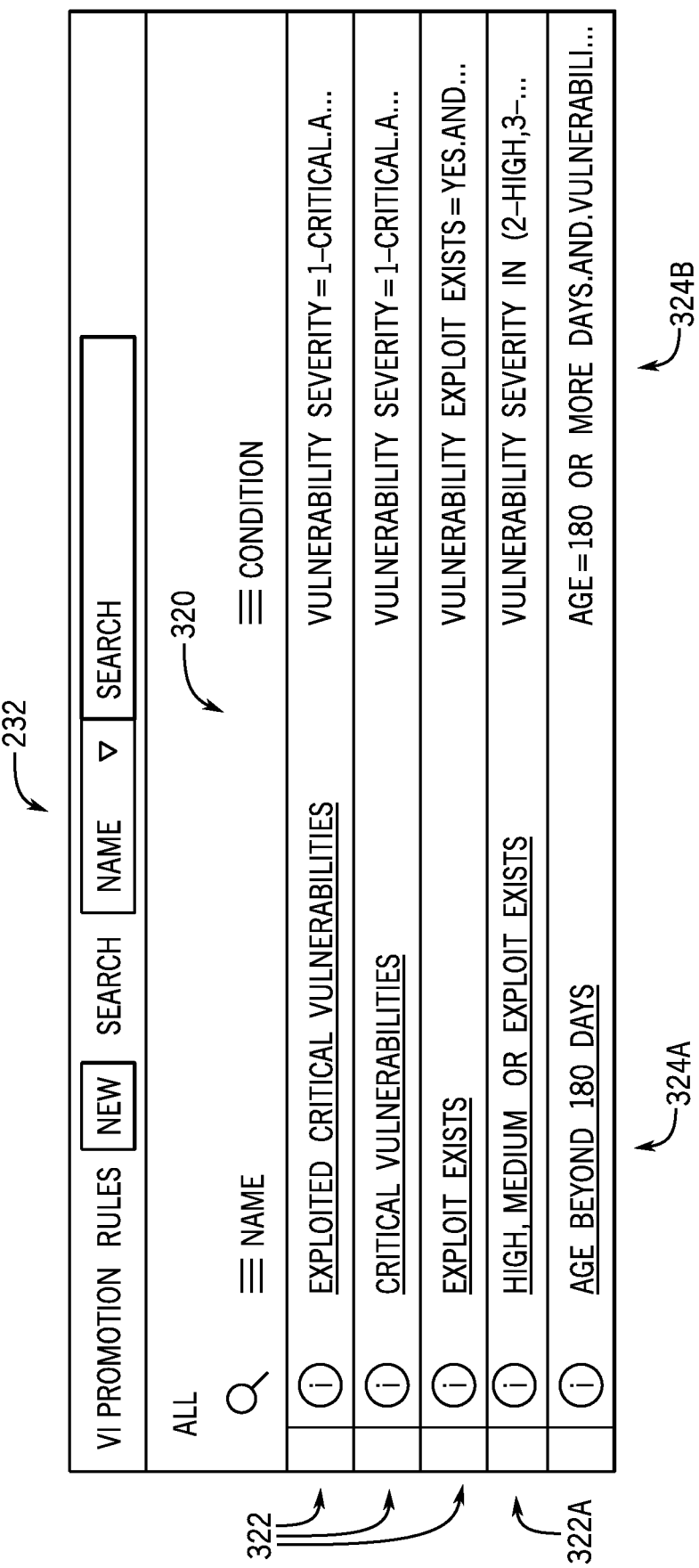
FIG. 9 is a simulated screenshot of a portion of an embodiment of the GUI that enables a user to manage detection promotion rules stored in a detection promotion rules table of the CMDB, in accordance with aspects of the present disclosure.
Figure 10:
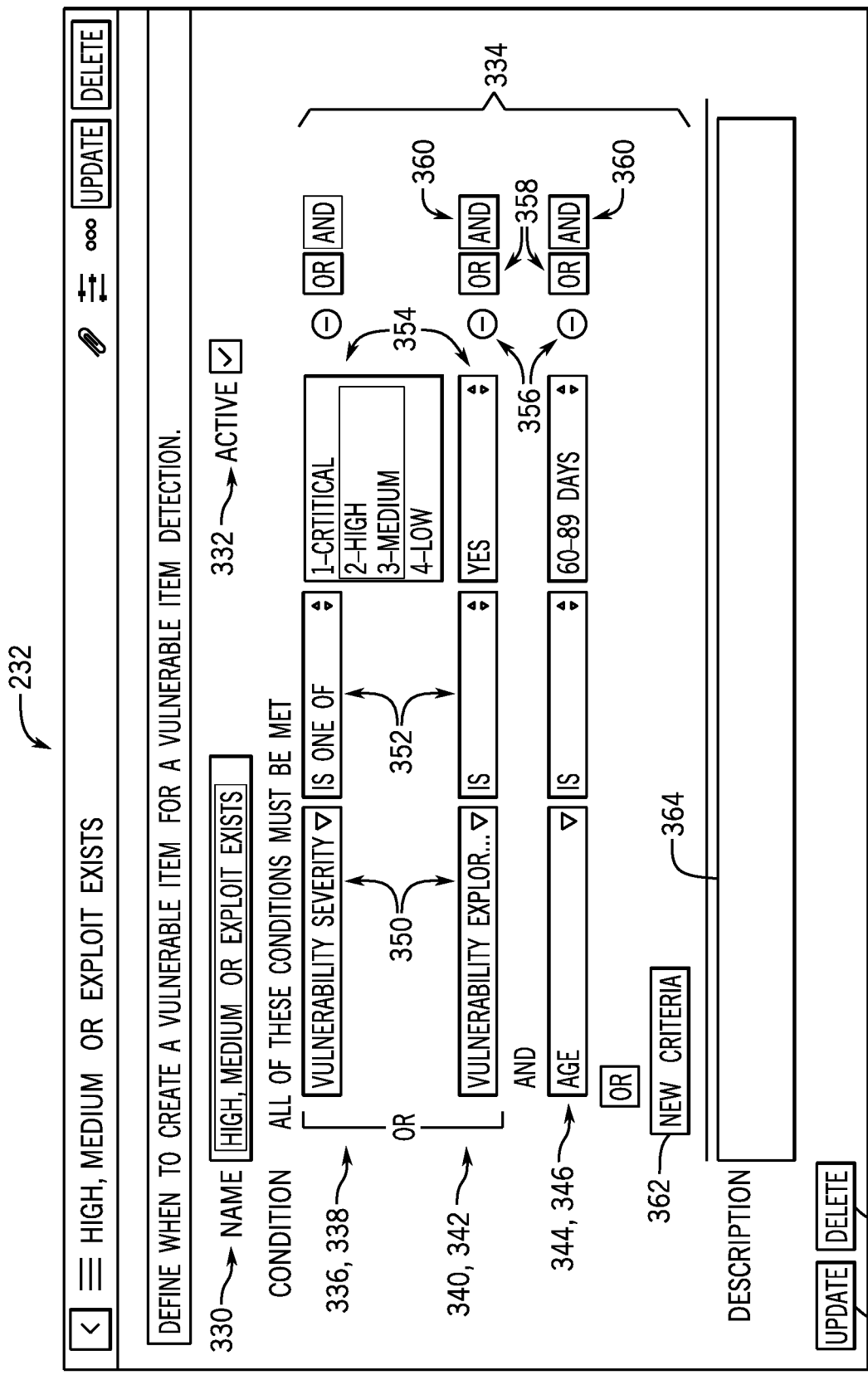
FIG. 10 is a simulated screenshot of a portion of an embodiment of the GUI that enables a user to view and modify the conditions of a detection promotion rule, in accordance with aspects of the present disclosure.

FIGS. 8-10 are example simulated screenshots of embodiments of the GUI 232, which may be part of the VR server 222 hosted by the client instance 102. As noted, the GUI 232 may be presented to a user, for example, via a web browser executed on the client device 20, as illustrated in FIG. 4. It should be noted that the illustrated embodiments of the GUI 232 in FIGS. 8-10 are merely provided as examples, and in other embodiments, the GUI 232 may include additional user interface elements, different user interface elements, different layouts, and so forth, in accordance with the present disclosure.

The embodiment of the GUI 232 illustrated in FIG. 8 enables a user to view and modify detections stored in the detections table 246. As such, the embodiment of the GUI 232 illustrated in FIG. 8 includes a table 310 that is designed to present a portion of the detections table 246 of the CMDB 220. The illustrated table 310 includes a number of rows 312 (e.g., records, entries), each representing a separate detection object that is stored in the detections table 246. The columns 314 of the table 310 correspond to the fields or attributes of these detection objects, which store scanning data related to each detected vulnerability. The illustrated table 310 includes a Number column 314A that presents a unique identifier (e.g., a generated unique value) for each detection. The CI column 314B presents a unique identifier of a CI of the CIs table 242 that is associated with or related to each of the illustrated detections in the CMDB 220. The Vulnerability column 314C presents a unique identifier of a vulnerability in the vulnerabilities table 244 that is associated with or related to each of the illustrated detections in the CMDB 220. The Status column 314D presents a status of each of the detections, such as "open", "closed", "erroneous", "irrelevant", and so forth. The Age column 314E presents an age range of each of the detections, which is between 7 and 29 days for the illustrated detections. The Last Found column 314F presents a time stamp indicating the most recent time at which the indicated vulnerability was detected for the indicated CI. The Vulnerable Item (VI) column 314G presents a unique identifier of a VI of the VIs table 252 that is associated with or related to certain detections within the CMDB 220. In particular, for the illustrated example, application of an example detection promotion rule to at least detection 312A resulted in the creation of corresponding or related VI 316A, and application of the detection promotion rule to at least detection 312B resulted in the creation of corresponding or related VI 316B. It may also be noted that, since the remaining detections have not previously satisfied a detection promotion rule, the remaining detections are not associated with, or related to, a respective VI.

The embodiment of the GUI 232 illustrated in FIG. 9 enables a user to manage detection promotion rules. As such, the embodiment of the GUI 232 illustrated in FIG. 9 includes a table 320 that is designed to present a portion of the detection promotion rules table 258. The illustrated table 320 includes a number of rows 322, each representing a separate detection promotion rule object that is stored in the detection promotion rules table 258. The columns 324 of the table 320 correspond to the certain fields of the detection promotion rules objects, which store configuration data related to each detection promotion rule. The Name column 324A presents a textual name of each detection promotion rule. The Condition column 324B presents a partial textual presentation of the conditions of each detection promotion rule. Upon receiving a user selection of one of detection promotion rule 322A, the GUI 232 of FIG. 10 may be presented and populated with details regarding the selected detection promotion rule.

The embodiment of the GUI 232 illustrated in FIG. 10 enables a user to view and modify the conditions of a detection promotion rule. As such, the fields of the GUI 232 illustrated in FIG. 10 correspond to attributes of an example detection promotion rule. The illustrated GUI 232 includes a Name field 330 that is designed to receive and present a name of the promotion rule. The GUI 232 includes an active checkbox 332 that is designed to receive and present an indication of whether or not the promotion rule is active. The GUI 232 includes a conditions section 334 that, for the illustrated example, presents the three conditions that have been configured for the promotion rule. The condition section 334 includes a first set of user interface elements 336 that present details of a first condition 338, a second set of user interface elements 340 that present details of a second condition 342, and a third set of the user interface elements 344 that present details of a third condition 346 of the example promotion rule. While the example detection promotion rule includes three conditions, it may be noted that, in other examples, a detection promotion rule may include any suitable number of conditions.

Each of the sets of user interface elements 336, 340, and 344 includes a first dropdown box 350 that is populated with the names of fields of certain tables of the data model 240 illustrated in FIG. 4. For example, in certain embodiments, the first dropdown box 350 may include the names of fields or attributes of the detections table 246, the vulnerabilities table 244, the CIs table 242, or any other relevant tables of the CMDB 220, from which the user can select a particular field upon which to build a condition. Each of the sets of user interface elements 336, 340, and 344 includes a second dropdown box 352 that is populated with comparison operators (e.g., "is", "is one of", "is not one of", "equals", "contains", "is greater than", "is less than", and so forth), from which the user can select for each condition. Additionally, each of the sets of user interface elements 336, 340, and 344 includes a third user interface element 354 that, for the illustrated example, may be a select box or a dropdown box that is populated with potential values for the field selected in the first dropdown box 350 and the comparison selected in the second dropdown box 352. As such, in addition to populating the values of the third user interface element 354, the third user interface element 354 may change from being a select box, a dropdown box, a text box, and so forth, based on the user selections of the first and second dropdown boxes 350 and 352, as the conditions are being configured by the user.

Each of the sets of user interface elements 336, 340, and 344 also includes a remove button 356, and the GUI 232 may remove a condition from the promotion rule in response to receiving a user selection of this element. Additionally, each of the sets of user interface elements 336, 340, and 344 includes an "OR" button 358 and an "AND" button 360 that are used to define how the conditions of the promotion rule are combined. For the illustrated example, the first condition 338 and second condition 342 are combined with an "OR" Boolean operation, and then this result is then combined with an "AND" Boolean operation with respect to the third condition 346. More specifically, for the illustrated example, the conditions 338, 342, and 346 of the example promotion rule dictate that, for each detection in the detections table 246 that is associated with a vulnerability in the vulnerabilities table 244, wherein the vulnerability has a "Vulnerability Severity" attribute value that is either high or medium and a "Vulnerability Exploit Exists" attribute value that is true, and wherein the detection has an "Age" attribute value indicating that the scanning data associated with the creation of the detection was collected between 60 and 89 days ago, then a new VI is created and associated with the detection.

The embodiment of the GUI 232 illustrated in FIG. 10 also includes a "New Criteria" button 362, and the GUI 232 may respond to a user selection of this element by adding additional sets of user interface elements to the condition section 334 to enable the user to configure additional conditions of the promotion rule. The GUI 232 includes a text box 364 that is designed to receive and present a textual description of the promotion rule. The GUI 232 includes an "Update" button 366, and the GUI 232 may respond to a user selection of this element by updating the data stored in the detection promotion rules table 258 for the illustrated promotion rule. The GUI 232 includes a "Delete" button 368, and the GUI 232 may respond to a user selection of this element by removing the promotion rule from the detection promotion rules table 258. In other embodiments, the GUI 232 may also include user interface elements to define aspects of the newly created VI. For example, in certain embodiments, the GUI 232 may include suitable user interface elements (e.g., dropdown boxes, select boxes, text boxes, and so forth) that enable a user to define a value for a selected attribute or field of the VI, an assignment of the VI for resolution, a VI group to which the VI will belong, a priority of the VI, and so forth.

The embodiment of the GUI 232 illustrated in FIG. 11 enables a user to view and modify a VI stored in the VIs table 252 of the CMDB 220. For the illustrated embodiment, the GUI 232 presents an example VI that has been created and associated with a detection in response to detection promotion rule being satisfied. As such, the fields of the illustrated GUI 232 generally correspond to fields of the VIs table 252 and the detections table 246. The GUI 232 includes a detections section 380 that having a table 382 that presents the detection 384 stored in the detections table 246 that satisfied the conditions of the detection promotion rule, and as such, was related to the newly created VI.

For the example illustrated in FIG. 11, certain attributes of the newly created VI are populated with data gleaned from the related detection 384. For example, the GUI 232 includes a source field 386 that is designed to present the name of a source of the example VI, which is populated with the name of the TPS service 226 or MID server 24 that provided the scanning data for the detection 384. The GUI 232 of FIG. 11 includes a vulnerability field 388 designed to present the identity of a vulnerability related to the example VI, and this field is populated with the unique identifier for the vulnerability that is related to the detection 384. The GUI 232 of FIG. 11 also includes a configuration item field 390 designed to present the identity of a vulnerability related to the example VI, and this field is populated with the unique identifier of the CI that is related to the detection 384.

The technical effects of the present disclosure include an improved CMDB design that substantially reduces memory and resource consumption, resulting in a more efficient system. The disclosed VR server is designed to receive scanning data and to store highly-efficient detection objects related to identified CI vulnerabilities in a non-audited detections table. The VR server may then periodically apply stored detection promotion rules to the stored detections, as well as information related to these detections in the CMDB, to determine whether the one or more conditions of a detection promotion rule have been satisfied. In response to a detection promotion rule being satisfied, a less-efficient VIs may be created and associated with the detections that satisfied the rule. The system includes a GUI that enables a user to create and modify these detection promotion rules. As such, the system enables detection promotion rules to be defined that delay or avoid the creation of the more resource-intensive VI objects until or unless certain user defined conditions are identified within the stored detections. For example, detection promotion rules may be defined that result in the creation of corresponding VIs only for situations in which detections are indicative of a relevant or critical vulnerability that involves manual intervention and is ripe for remediation. This generally prevents important VIs from being lost in a massive collection of VIs, which may delay notice and remediation of important or critical vulnerabilities. Moreover, since the detections are considerably lower in processing, memory, and storage resource cost compared to VIs, the disclosed design substantially reduces resource consumption and improves the efficiency and operation of the CMDB.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A configuration management database (CMDB) system, comprising:
at least one memory storing a database, wherein the database comprises a configuration items (CIs) table configured to store CI objects, a vulnerable items (VIs) table configured to store VI objects, a detections table configured to store detection objects representing detections of vulnerabilities for the stored CI objects, and a detection promotion rules table configured to store detection promotion rule objects that each include one or more promotion conditions, wherein the stored detection objects are substantially lighter-weight and lower-cost within the CMDB system than the stored VI objects, and wherein the detections table stores a relationship between a first detection object of the stored detection objects, a CI object of the stored CI objects, and a VI object of the stored VI objects; and
at least one processor configured to execute instructions stored in the at least one memory to cause the CMDB system to perform actions comprising:
receiving a request to create a new detection promotion rule object, wherein the request comprises one or more promotion conditions of the new detection promotion rule object; and
periodically evaluating the stored detection objects of the detections table for potential promotion to corresponding VI objects by:
for each active detection promotion rule object of the stored detection promotion rule objects including the new detection promotion rule object:
evaluating the one or more promotion conditions of the active detection promotion rule object based on the stored detection objects; and
determining that the one or more promotion conditions of the active detection promotion rule object have been satisfied by a second detection object of the stored detection objects, and in response, promoting the second detection object by creating a new VI object in the VIs table and relating the new VI object to the second detection object.

2. The system of claim 1, wherein each of the one or more promotion conditions comprises:
an attribute, wherein the attribute is an attribute of the detection object, an attribute of a vulnerability object related to the detection object, or an attribute of a CI object related to the detection object;
a comparison operator that is associated with the attribute; and
an attribute value that is associated with the attribute.

3. The system of claim 2, wherein the comparison operator is one of: "is equivalent to", "is one of", "is not one of", "contains", "is greater than", or "is less than".

4. The system of claim 2, wherein the attribute value comprises a binary value, one or more integer values, a text string, an object, or a group of objects.

5. The system of claim 2, wherein the one or more promotion conditions comprise a plurality of promotion conditions, wherein the plurality of promotion conditions are combined using Boolean AND/OR operators.

6. The system of claim 1, wherein the at least one processor is configured to execute the instructions stored in the at least one memory to cause the CMDB system to perform actions comprising:
creating the new detection promotion rule object in the detection promotion rule table having the one or more promotion conditions in response to receiving the request.

7. The system of claim 1, wherein the at least one processor is configured to execute the instructions stored in the at least one memory to cause the CMDB system to perform actions comprising:
receiving, from an external server, scanning data from a vulnerability scan of a client network, wherein the scanning data comprises information regarding the detections of the vulnerabilities of CIs associated with the client network; and
creating a respective detection object in the detections table for each of the detections of the vulnerabilities of CIs associated with the client network in the scanning data.

8. The system of claim 7, wherein the database comprises a vulnerabilities table configured to store vulnerability objects representing the vulnerabilities detected for the stored CI objects, and wherein the at least one processor is configured to execute the instructions stored in the at least one memory to cause the CMDB system to perform actions comprising:
receiving vulnerability data from the external server, wherein the vulnerability data comprises information regarding the vulnerabilities detected for the CI objects associated with the client network; and
creating a new vulnerability object in the vulnerabilities table for each of the detected vulnerabilities in the vulnerability data, and relating each vulnerability object to one or more corresponding detections objects in the detections table.

9. The system of claim 8, wherein, to evaluate the one or more promotion conditions of the active detection promotion rule object based on the stored detection objects, the at least one processor is configured to execute the instructions stored in the at least one memory to cause the CMDB system to perform actions comprising:
evaluating the one or more promotion conditions of the active detection promotion rule object based on attribute values of the detection objects stored in the detections table, as well as attribute values of the vulnerability objects stored in the vulnerabilities table that are related to the detection objects.

10. The system of claim 1, wherein the CMDB is hosted as part of a client instance by a data center.

11. The system of claim 1, wherein the VIs table is an audited table, wherein the detections table is a non-audited table, and wherein the at least one processor is configured to execute the instructions stored in the at least one memory to cause the CMDB system to perform actions comprising tracking changes in audited tables of the CMDB system.

12. A method of operating a vulnerability response (VR) server of a configuration management database (CMDB), comprising:
receiving, from an external server, scanning data from a vulnerability scan of a client network, wherein the scanning data comprises information regarding detections of vulnerabilities of configuration items (CIs) associated with the client network;
storing a set of detections based on the received scanning data, wherein each of the set of detections is substantially lighter-weight and lower-cost than a vulnerable item (VI) within the CMDBB, and wherein the stored set of detections includes a relationship between a first detection of the stored set of detections, a CI associated with the client network, and a VI within the CMDB;
receiving a request to create a new detection promotion rule, wherein the request comprises one or more promotion conditions of the new detection promotion rule;
creating the new detection promotion rule in a set of detection promotion rules having the one or more promotion conditions in response to receiving the request; and
periodically evaluating the stored set of detections for potential promotion to corresponding VIs by:
for each active detection promotion rule of the set of detection promotion rules:
evaluating one or more promotion conditions of the active detection promotion rule based on the stored set of detections; and
determining that the one or more promotion conditions of the active detection promotion rule have been satisfied by a detection of the stored set of detections, and in response, promoting the detection by creating a new VI and updating the CMDB to indicate a relationship between the promoted detection and the new VI.

13. The method of claim 12, wherein evaluating comprises:
evaluating the one or more promotion conditions of the active detection promotion rule attributes of a stored set of CIs that are related to the stored set of detections, evaluating a stored set of vulnerabilities that are related to the stored set of detections, or evaluating both.

14. The method of claim 13, comprising:
receiving, from a client device, a request to create a new detection promotion rule, wherein the request comprises the one or more promotion conditions; and
creating the new detection promotion rule having the one or more promotion conditions in response to receiving the request.

15. The method of claim 12, wherein each of the one or more promotion conditions comprises:
an attribute, wherein the attribute is a detection attribute, a vulnerability attribute, or a configuration item (CI) attribute related to the set of detections;
a comparison operator that is associated with the attribute, wherein the comparison operator is one of: "is equivalent to", "is one of", "is not one of", "contains", "is greater than", or "is less than"; and
an attribute value that is associated with the attribute, the attribute value comprises a binary value, one or more integer values, a text string, an object, or a group of objects.

16. The method of claim 12, wherein the external server is a management, instrumentation, and discovery (MID) server associated with the client network.

17. One or more non-transitory, computer-readable media at least collectively storing instructions executable by a processor of a vulnerability response server of a configuration management database (CMDB), the instructions comprising instructions to:
receive, from an external server, scanning data from a vulnerability scan of a client network, and in response, store a set of detections based on the received scanning data, wherein the received scanning data comprises information regarding detected vulnerabilities of configuration items (CIs) associated with the client network, and wherein each of the set of detections is substantially lighter-weight and lower-cost than a vulnerable item (VI) within the CMDB, and wherein the stored set of detections stores a relationship between a first detection of the stored set of detections, a CI associated with the client network, and a VI within the CMDB;

receive a request to create a new detection promotion rule, wherein the request comprises one or more promotion conditions of the new detection promotion rule;

create the new detection promotion rule in a stored set of detection promotion rules having the one or more promotion conditions in response to receiving the request; and periodically evaluate the stored set of detections for potential promotion to corresponding VIs by:
    evaluating the one or more promotion conditions of a detection promotion rule of the stored set of detection promotion rules based on the stored set of detections; and
    determining that the one or more promotion conditions of the detection promotion rule have been satisfied by a detection of the stored set of detections, and in response, promoting the detection by creating a new VI and updating the CMDB to indicate a relationship between the promoted detection and the new VI.

18. The media of claim 17, wherein the instructions comprise instructions to:
    receive vulnerability data from the external server, wherein the vulnerability data comprises information regarding the vulnerabilities detected for the CIs associated with the client network; and
    creating a set of vulnerabilities based on the received vulnerability data and relating each vulnerabilities of the set of vulnerabilities to one or more corresponding detections of the set of detections.

19. The media of claim 18, wherein the instructions to evaluate the one or more promotion conditions comprise instructions to:
    evaluate the one or more promotion conditions of the detection promotion rule based on the vulnerabilities of the set of vulnerabilities that are related to the one or more corresponding detections of the stored set of detections.

20. The media of claim 17, wherein the instructions to evaluate the one or more promotion conditions comprise instructions to:
    receive, from a client device, a request to create the detection promotion rule, and in response, create the detection promotion rule, wherein the request includes the one or more promotion conditions of the detection promotion rule.

* * * * *